US008933611B2

(12) United States Patent
Nakatsuka et al.

(10) Patent No.: US 8,933,611 B2
(45) Date of Patent: Jan. 13, 2015

(54) VIBRATION POWER GENERATOR, VIBRATION POWER GENERATING DEVICE AND COMMUNICATION DEVICE HAVING VIBRATION POWER GENERATING DEVICE MOUNTED THEREON

(75) Inventors: Hiroshi Nakatsuka, Osaka (JP); Masaaki Kuranuki, Kyoto (JP); Keiji Onishi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 832 days.

(21) Appl. No.: 13/130,877

(22) PCT Filed: Jun. 10, 2010

(86) PCT No.: PCT/JP2010/003862
§ 371 (c)(1),
(2), (4) Date: May 24, 2011

(87) PCT Pub. No.: WO2010/150472
PCT Pub. Date: Dec. 29, 2010

(65) Prior Publication Data
US 2011/0227545 A1    Sep. 22, 2011

(30) Foreign Application Priority Data
Jun. 26, 2009  (JP) .............................. P 2009-151941

(51) Int. Cl.
*H02N 11/00*    (2006.01)
*F02B 63/04*    (2006.01)

(52) U.S. Cl.
USPC ............................ 310/300; 310/309; 290/1 R

(58) Field of Classification Search
CPC ...................................................... H02N 1/08
USPC ......... 310/300, 309, 308; 290/1 R; 322/2 R, 3
See application file for complete search history.

(56) References Cited

U.S. PATENT DOCUMENTS

| 2,756,337 | A  | * | 7/1956 | Shanahan ......................... 331/6 |
| 6,388,362 | B1 | * | 5/2002 | Suzuki et al. ............. 310/316.02 |
| 6,509,671 | B2 | * | 1/2003 | Takeda et al. ............. 310/316.01 |
| 6,566,821 | B2 | * | 5/2003 | Nakatsuka et al. ...... 315/209 PZ |
| 6,720,705 | B2 | * | 4/2004 | Nakatsuka et al. ...... 310/316.01 |

(Continued)

FOREIGN PATENT DOCUMENTS

| JP | 2005-529574 | 9/2005 |
| JP | 2008-245419 | 10/2008 |

(Continued)

OTHER PUBLICATIONS

International Search Report issued Sep. 14, 2010 in International (PCT) Application No. PCT/JP2010/003862.

(Continued)

*Primary Examiner* — Julio C. Gonzalez
(74) *Attorney, Agent, or Firm* — Wenderoth, Lind & Ponack, L.L.P.

(57) ABSTRACT

Electricity generated by a vibration power generator 200 can be extracted efficiently by providing the vibration power generator 200, a rectifier circuit bridge 205, an output controlling circuit 201, a load detecting circuit 202 and a frequency detecting circuit 204 and detecting a frequency of the vibration power generator 200 and then controlling an impedance of an output controlling circuit 101 depending on the frequency.

19 Claims, 13 Drawing Sheets

(56) References Cited

U.S. PATENT DOCUMENTS

| | | | |
|---|---|---|---|
| 2004/0007877 A1 | 1/2004 | Boland et al. | |
| 2004/0016120 A1 | 1/2004 | Boland et al. | |
| 2004/0104884 A1* | 6/2004 | Takeda et al. | 345/102 |
| 2008/0048521 A1 | 2/2008 | Mabuchi et al. | |
| 2008/0122321 A1* | 5/2008 | Iwasaki et al. | 310/366 |
| 2009/0121809 A1* | 5/2009 | Nakatsuka et al. | 333/187 |
| 2010/0052469 A1 | 3/2010 | Naruse et al. | |
| 2010/0109472 A1* | 5/2010 | Naruse et al. | 310/300 |

FOREIGN PATENT DOCUMENTS

| | | |
|---|---|---|
| JP | 2009-33809 | 2/2009 |
| JP | 2009-124807 | 6/2009 |
| WO | 2008/053793 | 5/2008 |

OTHER PUBLICATIONS

International Preliminary Report on Patentability issued Jan. 26, 2012 in International (PCT) Application No. PCT/JP2010/003862.

* cited by examiner

VIBRATION POWER GENERATOR, VIBRATION POWER GENERATING DEVICE AND COMMUNICATION DEVICE HAVING VIBRATION POWER GENERATING DEVICE MOUNTED THEREON

TECHNICAL FIELD

The present invention relates to a vibration power generator, a vibration power generating device, and a communication device having the vibration power generating device mounted thereon, and relates to a static induction vibration power generator using an electret material, a vibration power generating device, an electrical device having the vibration power generating device, and a communication device having the vibration power generating device mounted thereon.

BACKGROUND ART

A static induction vibration power generating device has been already proposed, in which electric charges are provided to one electrode of a variable capacitance, the electrode charges are induced to the opposed electrode by a static induction, a change in the induced electric charges is brought about by a change in capacitance, and the change in the electric charges is extracted as electrical energy (refer to, for example, Patent document 1).

FIG. 7 shows a static induction vibration power generator described in the aforementioned Patent document 1. FIG. 7 is a schematic cross-sectional view of a vibration power generator 10 using an electret.

The vibration power generator 10 is composed of a first substrate 11 having a plurality of conductive surface regions 13 and a second substrate 16 having a plurality of electret material regions 15. The first substrate 11 and the second substrate 16 are disposed so as to have a predetermined clearance each other. The second substrate including the electret material regions 15 is fixed. The first substrate 11 having the conductive surface regions 13 is coupled to a fixation structure 17 through springs 19. The springs 19 are connected to the both side surfaces of the first substrate 11, and also connected to the fixation structure 17. The first substrate 11 is capable of returning to its home position due to the springs 19, or the first substrate makes a lateral motion (for example, an X-axial motion) to be capable of returning to the home position. This movement brings about increase and decrease of the overlapping area between the electret material regions 15 and the opposed conductive surface regions 13, which results in a change of electric charges in the conductive surface regions 13. A static induction vibration power generator performs electrical generation by extracting the change of electric charges as electrical energy.

Patent document 2 discloses an electrostatic acting device using a static induction vibration power generator. An example of the electrostatic acting device is shown in Patent document 2. As shown in FIG. 8, this device 41 is composed of:
- a vibration power generator composed of a first electrode section 20 including a plurality of movable electrodes 22a and 22b, a second electrode section 30 including an electret film 32 and a first dielectric layer 34 formed on the film 32 and a first insulating film 33 provided between the first dielectric layer 34 and the electret film 32,
- bridge rectifier circuits 42a, 42b respectively connected to the plurality of electrodes 22a, 22b,
- DC converters 43a, 43b connected to the bridge rectifier circuits, and
- a load 40.

The bridge rectifier circuits rectify AC voltages output from the respective movable electrodes 22 and convert the AC voltages into a DC voltage. The converted DC voltage is converted by a DC-DC converter and then output to the load.

BACKGROUND ART Document

Patent Document

Patent Document 1: JP 2005-529574A (P.10 to 11, FIG. 4)
Patent Document 2: WO 2008/0053793 (FIGS. 1 and 10)

SUMMARY OF INVENTION

Problem to be Solved by the Invention

A certain static induction vibration power generator (which may be referred to as a "vibration power generator" hereinafter) generates electricity by extracting, as electric energy, the electric charges induced due to the change in capacitance when any one of two opposed electrodes is vibrated with a constant amplitude. Therefore, when the load is a matching impedance (that is, when the impedance of the load matches with the impedance of the vibration power generator), a maximal output power is obtained. In the other load conditions, the output power is small. Further, an internal impedance of the vibration power generator varies depending on the vibration frequency, and thereby the matching impedance also varies. In other words, there has been problem that the vibration power generator connected to the load changes its electric-generating capacity depending on the condition of the load or the condition of vibration.

Further, the vibration power generators which have been proposed are not constructed to transmit a signal which indicates the output condition of the generator (the frequency and the output power), to another circuit. For this reason, for example, when the vibration power generator does not vibrate and not generate power, the load is operated unnecessarily, and therefore the power from a storage battery or other power source(s) is wasted.

The present invention is made to solve the problem. The object of the present invention is to provide a vibration power generating device which enables a load to be operated without reducing an output power even when the condition of the load is changed, and a vibration power generator and a vibration power generating device which are capable of extracting the power efficiently depending on the vibration frequency, and a vibration power generator and a vibration power generating device which enables the power generating condition to be detected, and a communication device using the vibration power generating device or the vibration power generator.

Means to Solve the Problem

In order to solve the problem, the present invention provides a vibration power generating device which detects condition of a load circuit and/or a vibration frequency of a vibration power generator, so as to control an impedance of an output controlling circuit.

In a first aspect, the present invention provides a vibration power generating device including:
a vibration power generator, a rectifier circuit which rectifies an AC output voltage from the vibration power generator and converts the AC output voltage into a DC voltage, an output controlling circuit which controls an output from the rectifier circuit and inputs the output to a load circuit, a frequency detecting circuit which detects a vibration frequency of the vibration power generator, wherein an impedance of the output controlling circuit is controlled based on a feedback signal from the frequency detecting circuit.

In the vibration power generating device according to the first aspect, it is preferable that the vibration power generator is one including:

an electrode group A consisting of a plurality of first electrodes, which group is formed on a first substrate, an electrode group B consisting of a second electrode and a third electrode, which group is formed on a second substrate, wherein any one of the electrode group A and the electrode group B is capable of vibrating in at least one direction which is within a plane parallel to the first substrate and the second substrate, each electrode in any one of the electrode group A and the electrode group B contains a film retaining electric charges, the electrode group A and the electrode group B are opposed to each other with a gap therebetween, and which generator generates power using change in overlapping area between the first electrode and the second electrode, and outputs a signal depending on a frequency of the power generation using change in overlapping area between the first electrode and the third electrode. In that case, the signal which is output depending on the frequency of the power generation using the change in overlapping area between the first electrode and the third electrode is transmitted to the frequency detecting circuit and, based on the signal, the frequency detecting circuit transmits the feedback signal to the output controlling circuit.

In a second aspect, the present invention also provides a vibration power generating device including:

a vibration power generator, a rectifier circuit which rectifies an AC output voltage of the vibration power generator and converts the AC output voltage into a DC voltage, an output controlling circuit which controls an output from the rectifier circuit and inputs the output to a load circuit, and a load detecting circuit which detects condition of the load circuit, wherein an impedance of the output controlling circuit is controlled based on a feedback signal from the load detecting circuit.

The vibration power generating devices according to the first aspect and the second aspect are characterized in that the devices detect the condition of the load circuit or the vibration frequency of the vibration power generator, and then control the impedance based on the results of the detection (or enable such control). This characteristic makes it possible to extract efficiently and stably the power generated by the vibration power generator, resulting in the vibration power generating device being capable of operating with a high-efficiency.

In a third aspect, the present invention provides a vibration power generator including:

an electrode group A consisting of a plurality of first electrodes, which group is formed on a first substrate, an electrode group B consisting of a second electrode and a third electrode, which group is formed on a second substrate, wherein any one of the electrode group A and the electrode group B is capable of vibrating in at least one direction which is within a plane parallel to the first substrate and the second substrate, each electrode in any one of the electrode group A and the electrode group B contains a film retaining electric charges, the electrode group A and the electrode group B are opposed to each other with a gap therebetween, and the third electrode is formed such that a capacitance formed by the third electrode and the first electrode is smaller than the capacitance formed by the second electrode and the first electrode, which generator generates power using change in overlapping area between the first electrode and the second electrode, and outputs a signal depending on the frequency of the power generation using change in overlapping area between the first electrode and the third electrode. The vibration power generator according to the third aspect is useful as the vibration power generator in the vibration power generating device according to the first aspect. Alternatively, this vibration power generator makes it possible that the signal depending on the frequency of the power generation which signal is output with use of change in overlapping area between the first electrode and the third electrode can be used as the signal for detecting the power generation state, and thereby unnecessary power loss can be eliminated in the load circuit which is driven by the power generated by this vibration power generator.

Effect of the Invention

The vibration power generating device according to the first aspect of the present invention can perform the output control depending on the vibration frequency when the vibration frequency of the vibration power generator is changed, which results in decrease in the lowering of output power due to the change of the vibration frequency. Further, the load can be controlled according to the vibration frequency in the vibration power generating device of the first aspect, resulting in that the output power from the vibration power generator can be stabilized. The vibration power generating device according to the second aspect of the present invention can reduce the lowering of the output power from the vibration power generator when the condition of the load is changed. When the vibration power generating devices according to the first aspect and the second aspect of the present invention are used, the conversion of the voltage level into a level which is required for the load circuits is easier compared to the case wherein the impedance control is not employed.

Further, the vibration power generator according to the third aspect of the present invention can be used as, for example, the vibration power generator in the vibration power generating device according to the first aspect of the present invention. The effects achieved in that case are as described above. Alternatively, the vibration power generator according to the third aspect of the present invention makes it possible to detect the power generation state in the vibration power generator so as to control the load circuit directly or through the output controlling circuit, based on the power generation state. Thereby, unnecessary power loss in the load circuit can be eliminated.

The communication device which uses the vibration power generating device or the vibration power generator of the present invention makes it possible to reduce the number of maintenances such as battery exchanges compared to a device wherein only the battery is a power source, or makes it possible to render the battery exchanging unnecessary.

DESCRIPTION OF EMBODIMENTS

Hereinafter, embodiments of the present invention will be described with reference to the accompanying drawings.

First Embodiment

Figure 1A:
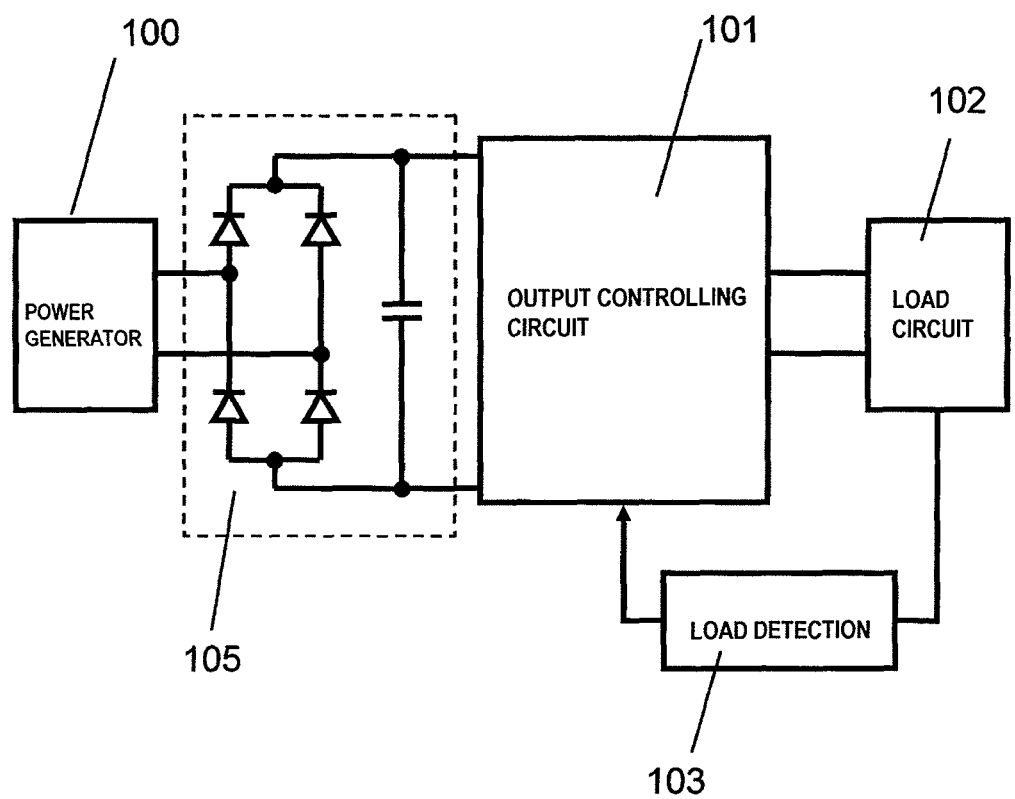
FIG. 1(a) is a block diagram showing a vibration power generating device according to a first embodiment of the present invention and FIG. 1(b) is a block diagram showing a load circuit connected to the vibration power generating device according to the first embodiment of the present invention.

FIG. 1 shows a block diagram of a vibration power generating device (which may be referred to as merely "power generating device") according to a first embodiment of the present invention and a block diagram of a load circuit connected thereto.

In FIG. 1, an output terminal of a vibration power generator 100 (which may be referred to as merely "power generator") is connected to a rectifier circuit block. The rectifier circuit block 105 is a full-wave rectifier circuit consisting of four diodes and a capacitor. The rectifier circuit block 105 is connected to an output controlling circuit 101 and the output from the vibration power generator 100 is transmitted to this circuit 101. The output controlling circuit 101 is connected to a load circuit 102. A load detecting circuit 103 detects the load condition of the load circuit 102 and feeds back the load condition to the output controlling circuit 101.

The vibration power generator 100 performs the power generation by extracting, as electric energy, the electric charges induced in a capacitor electrode due to the increase and decrease in the overlapping area between an electret electrode and the capacitor electrode. Herein, "the overlapping area between electrodes" refers to an area where two electrodes overlap when viewed from a direction perpendicular to a principal surface of a substrate where the electrode are provided. The construction of the vibration power generator is not particularly limited, and it may be of the construction as described in the "Background Art."

Figure 1B:
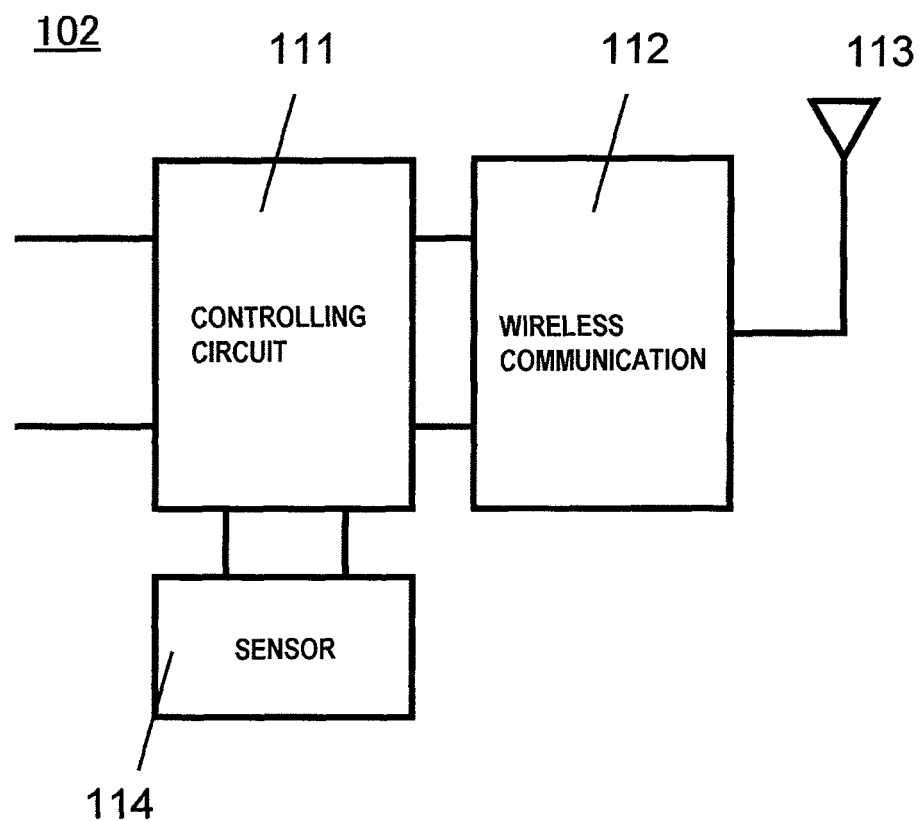

The load circuit 102 may specifically have a construction, for example, as shown in FIG. 1(b). The load circuit 102 shown in FIG. 1(b) is composed of at least a controlling circuit 111, a wireless communication circuit 112, an antenna 113 and a sensor 114. The device including this load circuit may be referred to as a wireless IC tag (or an RFID tag).

The operation of the vibration power generating device connected to the load circuit 102 shown in FIG. 1(b) is described below.

The electric charges induced by the static induction caused by external vibration are extracted as electric energy from the vibration power generator 100. At this time, the output from the vibration power generator 100 is an AC signal in response to the amplitude of the external vibration. The AC signal is converted into a DC voltage by the rectifier block 105 and then input to the output controlling circuit 101.

The output controlling circuit 101 controls the power supplied to the load circuit 102. When the operation of the load circuit 102 is light load and (the power supplied by the vibration power generator 100)>(the power consumed by the load circuit) is established, it is preferable that the charges are stored in an electric storage circuit and so on (not shown in FIG. 1(a)). Further, when the operation of the load circuit 102 is heavy load and (the power supplied by the vibration power generator 100)<(the power consumed by the load circuit) is established, the control is made such that the power is supplied from the electric storage circuit, and optionally from a battery and so on (not shown in FIG. 1(a)).

At this time, the load detecting circuit 103 controls the impedance of the output controlling circuit 101 depending on the operation of the load circuit 102 such that the impedance viewed from the rectifier circuit block 105 is rendered constant. The control can be made by, for example, switching the impedance of the output controlling circuit 101 in accordance with the operation of the load circuit 102 using a switching device or the like. The control itself may be conducted using a method generally employed in an electric/electronic circuit.

The load detecting circuit 103 may detect the power which is actually consumed by the load in operation when the load operates. Alternatively, the load detecting circuit 103 may detect the power consumed by a certain operation of the load, before the load makes the certain operation. Alternatively, the load detecting circuit 103 may detect the power consumed by another operation that is made after the load makes a operation. In other words, the load detecting circuit used in the vibration power generating device of the present invention may be a circuit which on-site detects the power actually consumed by the load and/or a circuit which predicts the power to be consumed.

When the load circuit 102 is the circuit shown in FIG. 1(*b*), the operation of the load circuit 102 can be detected by connecting the load detecting circuit 103 to the controlling circuit 111. Here, an example is shown wherein the power actually consumed by the load in operation is detected by detecting the current which is input to the controlling circuit. The load circuit shown in FIG. 1(*b*) has three operation modes, that is, standby (the current: small), microcomputer operating (the current: medium), and communication (the current: large). Therefore, the change in load in the load circuit 102 can be detected (including predicted) by connecting the load detecting circuit 103 to the controlling circuit 111. When the feedback signal is transmitted to the output controlling circuit 101 based on the detected change in load, the output controlling device 101 can control the load impedance depending on the operation modes.

Further, the timing of switching of the operation mode is controlled by the controlling circuit 111. Therefore, the change in load in the load circuit 102 may be predicted by connecting the load detecting circuit 103 to the controlling circuit 111.

The vibration power generating device according to this embodiment gives the following effects:

1) The electricity generated by the vibration power generator can be extracted efficiently even if the condition of the load changes; and 2) Controlling the load impedance such that it enables the power generation to be conducted efficiently makes it easy to design the voltage conversion circuit which converts the output voltage into a voltage level suited to the load.

Figure 2A:
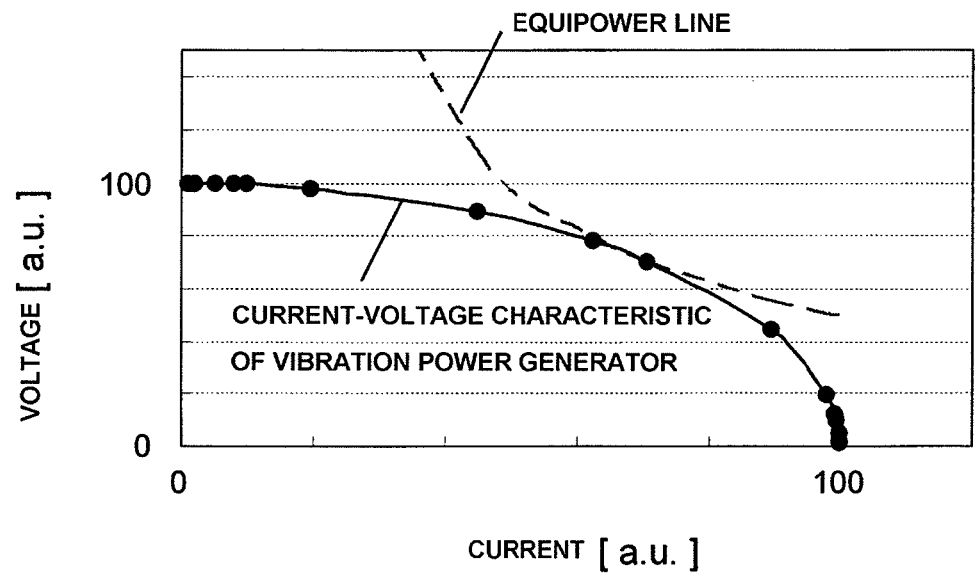
In FIG. 2(a) is a graph showing a relationship between an output voltage and an output current at a predetermined vibration frequency of a vibration power generator in the first embodiment of the present invention.
Figure 2B:
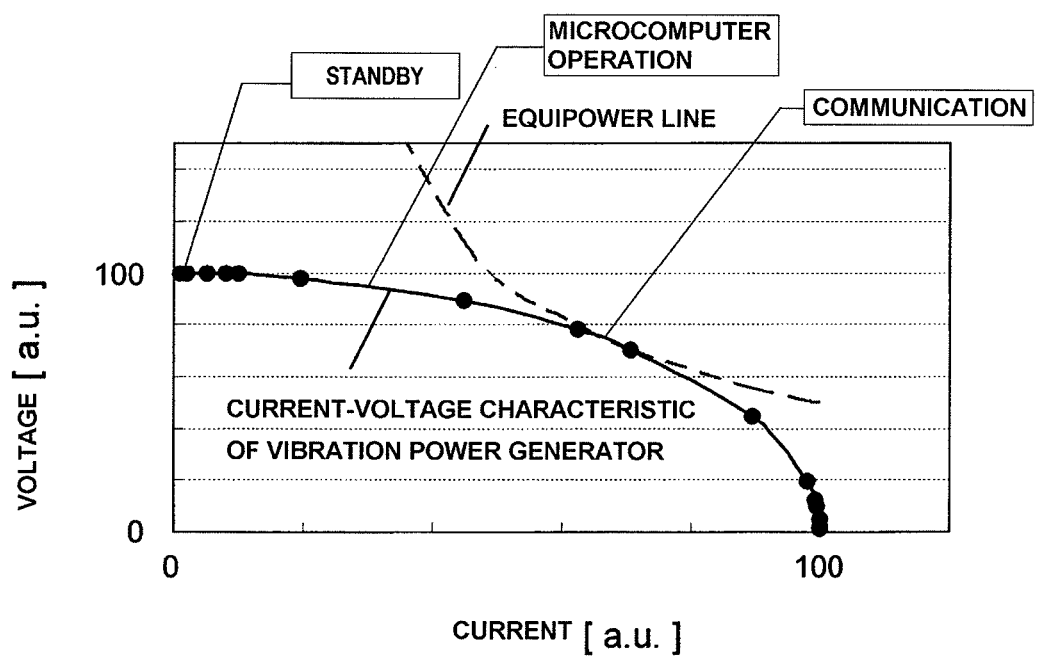
FIG. 2(b) is a graph showing an example of a relationship between the output voltage and the condition of the load circuit driven by the vibration power generating device according to the first embodiment of the present invention.

The effect 1) is further described with reference to FIG. 2. FIG. 2(*a*) is a graph showing an output current-voltage characteristic of the vibration power generator. In this graph, a horizontal axis is an output current of the vibration power generator, and a vertical axis is an output voltage of the vibration power generator. The output voltage, as shown by a solid line in this graph, is maximal at an open circuit state (maximal voltage), and minimum at a short-circuited state (minimum voltage). Since the load impedance is controlled corresponding to the condition of the load in the vibration power generating device of this embodiment, the power generated by the vibration power generator can be extracted efficiently at a load matching condition.

The vibration power generator having the characteristic as shown in FIG. 2(*a*) can be operated at a high efficiency if the output voltage is controlled to be 75% to 85% of the open-circuit voltage. More specifically, when the equipower line is drawn in the graph of FIG. 2(*a*) such that the power is made maximal, the curve shown in a broken line is obtained. A point where the equipower line contacts with the curve showing the current-voltage characteristic is approximately 80% of the maximal output voltage (the voltage at the load open circuit). Therefore, the induced charges can be extracted efficiently by controlling the output voltage such that it becomes 75% to 85% of the open circuit voltage, preferably 80%. The present embodiment can realize such control of output voltage by the control of the load impedance.

The effect 2) is described. When the load impedance is controlled such that the vibration power generator can perform efficient electrical generation, the design of the voltage conversion circuit which converts the output voltage of the vibration power generator to a voltage level suited to the load is made easier compared to the case where no control is made based on the detection of the load condition.

When the load circuit as shown in FIG. 1(*b*) is operated, the main operations of the load circuit are the microcomputer operation which stores the data from the sensor 114 in a memory (Operation 1), the communication operation wherein the data stored in the memory is transmitted by the wireless communication (Operation 2), and the standby operation wherein the load circuit 102 is rendered on standby (Operation 3). The load (power consumption) applied during these operations decreases in the following order, Operation 2>Operation 1>Operation 3, as shown in FIG. 2(*b*), and the load impedance is changed depending on the change. When this load circuit is operated by the electricity generated by the vibration power generator 100, the wireless communication (Operation 2) is performed when the maximal output is obtained, and the sensor is operated by a smaller power (Operation 1), and the load is rendered on standby at around the power wherein the output voltage is maximal (Operation 3). Here, the load impedance is controlled such that the vibration power generator conducts the efficient power generation (i.e. the maximal power is always obtained) and the output voltage is also constant, whereby the fluctuation in output voltage level due to the load fluctuation is suppressed. As a result, the design of the voltage conversion circuit which converts the output voltage to the voltage level suited to the load is easier.

When the output control as described above is possible, the power supply from the electric storage circuit and the other sources are not necessary. Therefore, the battery or the electric storage section can be eliminated by designing the load circuit and the vibration power generator in order to enable such control to be made.

Second Embodiment

Figure 3A:
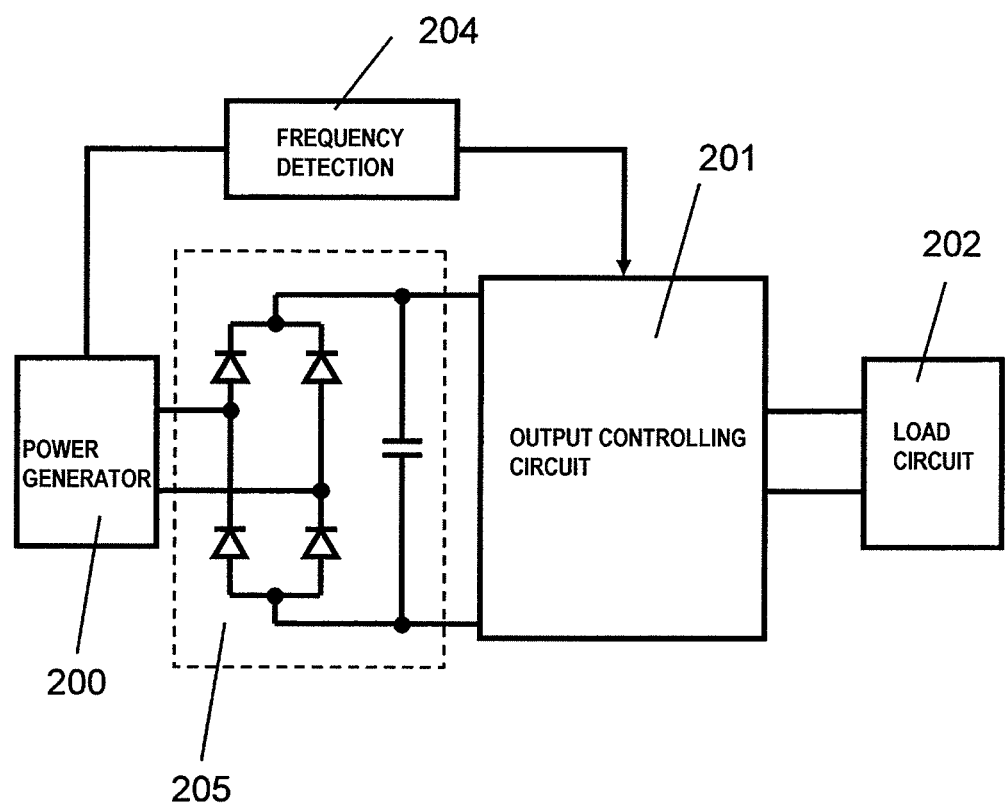
FIG. 3(a) is a block diagram showing a vibration power generating device according to a second embodiment of the present invention and (b) is a cross-sectional view of the vibration power generator constituting the vibration power generating device according to the second embodiment of the present invention.

FIG. 3 shows a block diagram of a vibration power generating device according to a second embodiment of the present invention. While the condition of the load circuit is detected and the detected results are fed back to the output controlling circuit to control the output in the power generating device of the first embodiment, a vibration frequency (the frequency of the output voltage) of the power generator is detected to control the output controlling circuit in this embodiment. In that point, the power generating device of the second embodiment is different from the power generating device of the first embodiment.

As shown in FIG. 3(*a*), an output terminal of a vibration power generator 200 is connected to a rectifier circuit block 205 in the power generating device of this embodiment. The rectifier circuit block 205 is a full-wave rectifier circuit consisting of four diodes and a capacitor. The rectifier circuit block 205 is connected to an output controlling circuit and the output of the vibration power generator 200 is conveyed to this circuit block 205. The output controlling circuit 201 is connected to a load circuit 202. A frequency detecting circuit 204 detects the frequency of the power output by the vibration power generator 200 and feeds back the output condition to the output controlling circuit 201.

Figure 3B:
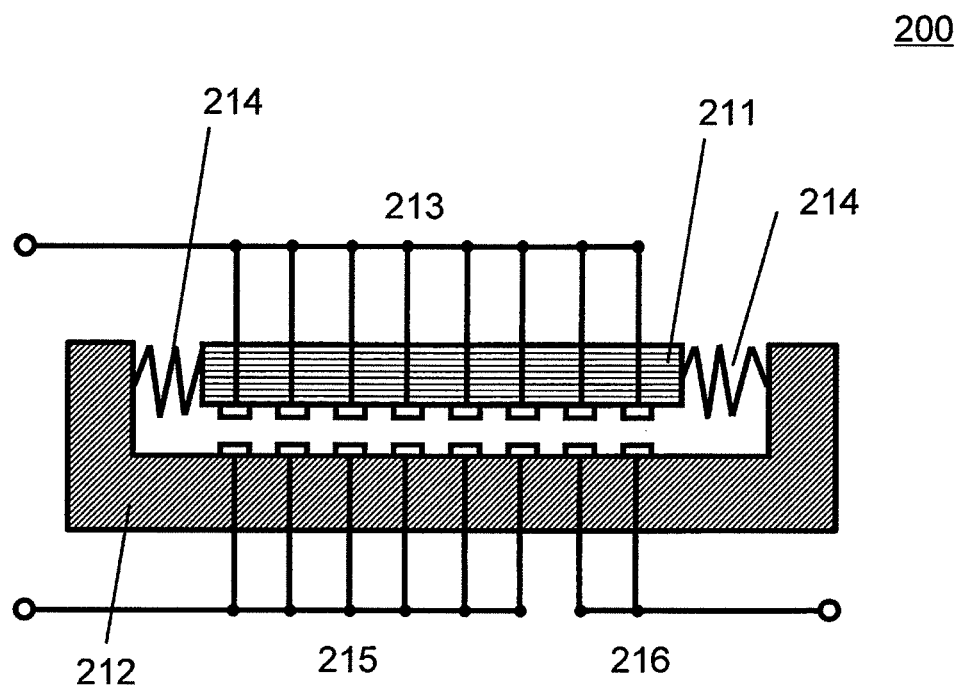

Next, the construction of the vibration power generator preferably employed in this embodiment is described with reference to FIG. 3(*b*). In FIG. 3(*b*), the vibration power generator 200 is composed of a first structure 211 (including a first substrate) and a second structure 212 (including a second substrate). In FIG. 3(*b*), first electrodes 213 (an electrode group A) are formed on the first structure 211. The first structure 211 is connected to the second structure 212 via an elastic structure 214. As shown in FIG. 3(b), second electrodes 215 and third electrodes 216 (an electrode group B) are formed on the second structure at positions opposed to the first electrodes 213.

The first structure 211 and the second structure 212 are connected such that the first electrodes 213 and the second electrodes 215 are opposed to each other. By fixing in this manner, the construction is obtained wherein the first electrodes 213 formed on the first structure 211 are relatively displaced to the second electrodes 215 formed on the second structure 212. The vibration power generator 200 conducts power generation by extracting, as electric energy, the charges induced in the second electrode 215 due to the increase and decrease of the overlapping area between the first electrodes 213 and the second electrodes 215, similarly to the conventional static induction vibration power generator.

Further, the third electrodes 216 are formed on the second structure 212 to detect the change in vibration frequency, and form the electrode group B together with the second electrodes 215 on the second structure 212 in the vibration power generator shown in FIG. 3(b). The third electrodes 216 are formed similarly to the second electrodes 215 such that they are opposed to the first electrodes 213. The vibration of the first structure 211 brings about the increase and decrease in the overlapping area between the first electrodes 213 and the third electrodes 216, and the charges are induced in the third electrode 216 and the AC voltage having the same frequency as that of the AC voltage output by the second electrodes 215 is output by the third electrodes 216.

In the vibration power generator shown in FIG. 3(b), any one of the electrode group A and the electrode group B contains a film retaining electric charges. The materials constituting the film retaining electric charges (which film may be referred to as an "electret") include polymeric materials such as polypropylene, polyethylene terephthalate, polyvinylchloride, and inorganic materials such as silicon oxide.

The third electrode 216 may be one, or more than one. In other words, the third electrode may be formed such that the capacitance formed between the third electrode and the first electrode may be smaller than that formed between the second electrodes and the first electrode. In that case, the impedance formed by the third electrode and the first electrode is higher than that formed by the second electrodes and the first electrode. Since the third electrodes 216 are for detecting the change in frequency, the impedance of the third electrodes is not required to be matched with that of the load, differently from the second electrodes for the power generation. Therefore, even if the third electrode 216 consists of one electrode, the frequency detection can be made sufficiently by appropriately adjusting the impedance.

The third electrode(s) is preferably formed at or around the center of the second substrate. When the third electrode(s) is positioned at the end (the side which is away from the vibration center) of the second substrate and the second substrate is moved and vibrated relatively to the first substrate, the overlapping (the crossover) between the third electrode and the first electrode is not caused, resulting in possibility of not detecting the frequency accurately.

Figure 10A:
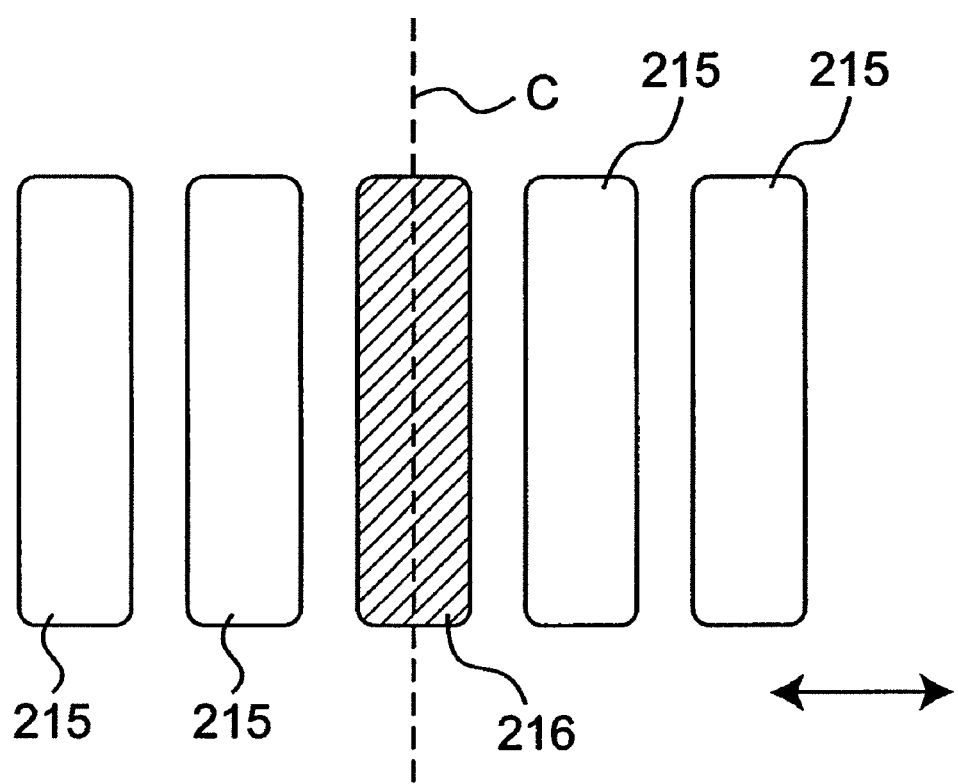
FIG. 10(a) is a plan view showing an example of arrangement of a third electrode and a second electrode in a vibration power generator of the present invention.
Figure 10B:
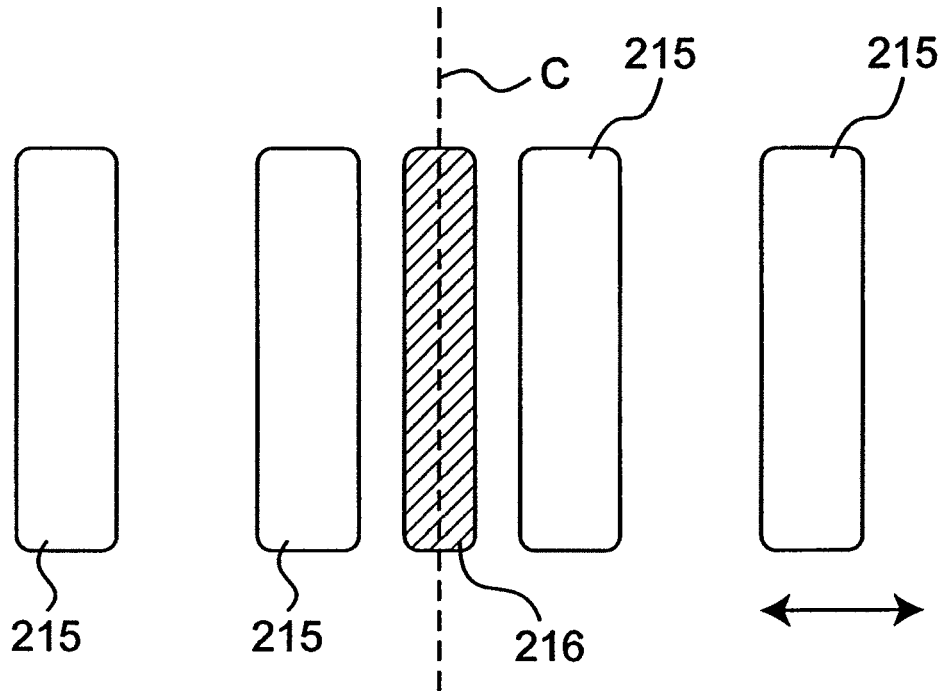
FIG. 10(b) is a plan view showing another example of the arrangement of the third electrode and the second electrode in the vibration power generator of the present invention.

Specifically, the second electrodes 215 and the third electrode 216 are preferably formed on the second substrate as shown in FIG. 10(a) and FIG. 10(b). In FIG. 10(a) and FIG. 10(b), the broken line shown by C is a center line of vibration when the second substrate vibrates in a direction shown by a double-headed arrow. In FIG. 10(a), the third electrode 216 is positioned such that they and the second electrodes are positioned with an equal interval. Therefore, the voltage output from the third electrode 216 is of the same phase as that of the voltage output from the second electrodes 215. In FIG. 10(b), the third electrode 216 is provided as if it is pushed into the second electrodes 215 positioned with an equal interval. Therefore, the voltage output from the third electrode 216 is of a phase reversed to that of the voltage output from the second electrodes 215.

The operation of the vibration power generating device including the vibration power generator constructed in a manner as described above is described below.

The power generated by the vibration power generator 200 is supplied to the load circuit 202 and consumed in the load circuit 202, similarly to the first embodiment. The point in which the power generating device of the second embodiment is different from that of the first embodiment is that the load circuit 202 is stationary and the change in vibration frequency of the vibration power generator 200 due to the change in the force applied externally is detected.

The frequency detecting circuit 204 is described in more detail. The frequency detecting circuit 204 detects the charges induced in the third electrodes 216 and performs the frequency conversion. The output controlling circuit 201 performs impedance control based on the detected frequency information such that the power output from the vibration power generator 202 is maximal.

The vibration power generating device according to this embodiment gives the following effects:

1) Even when the frequency of the vibration is changed, the electricity generated by the vibration power generator can be extracted efficiently;

2) Controlling the impedance of the output controlling circuit to be of a constant level makes it easy to design the voltage conversion circuit which converts the output voltage into a voltage level suited to the load.

Figure 4:
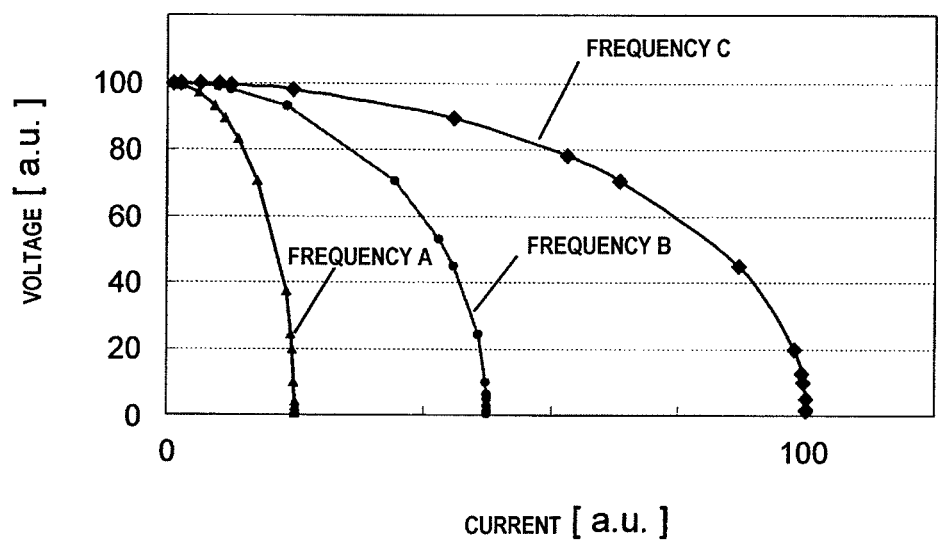
FIG. 4 is a graph showing relationships between the output currents and the output voltages at three different frequencies in a vibration power generator in the second embodiment of the present invention.

The effect 1) is further described with reference to FIG. 4. FIG. 4 is a graph showing an output current-voltage characteristic of the vibration power generator. In this graph, a horizontal axis is an output current of the vibration power generator, and a vertical axis is an output voltage of the vibration power generator. In this graph, the output characteristics are shown for different frequencies (Frequency A, Frequency B and Frequency C). The frequencies increase in the following order, Frequency A<Frequency B<Frequency C. The current value capable of being output varies by the change of the frequency. In this embodiment, the impedance is changed in response to the change in frequency in order that the power can be efficiently extracted in response to the change in frequency. Also in this embodiment, the power generator can be operated at a high efficiency by controlling the output voltage to be 75% to 85% of the open-circuit voltage, preferably 85% depending on the output characteristic at the frequency, as described in the first embodiment.

The effect 2) is described. When the circuit is designed such that the frequency of the vibration power generator is detected and the output controlling circuit is controlled based on the detected results, the design of the voltage conversion circuit which converts the output voltage of the vibration power generator into the voltage level suited to the load is easier compared to the case where no control based on the frequency detection is made.

In FIG. 3, the vibration power generator is provided with the third electrodes connected to an output terminal which is connected to the vibration frequency detecting circuit. In a variant of the second embodiment, the vibration power generator may be one which is constructed by the first electrodes and the second electrodes and is not provided with the third electrodes, and, for example, a conventional one. When such a vibration power generator is used, a portion of the electricity obtained in the vibration power generator is transmitted to the circuit wherein the frequency is detected, and then the frequency is detected. Therefore, in that case, the power which is to be supplied to the load is consumed by the detecting circuit, whereby the efficiency of the vibration power generator may be lower compared to the case where the vibration power generator shown in FIG. 3 is used.

Third Embodiment

Figure 5:
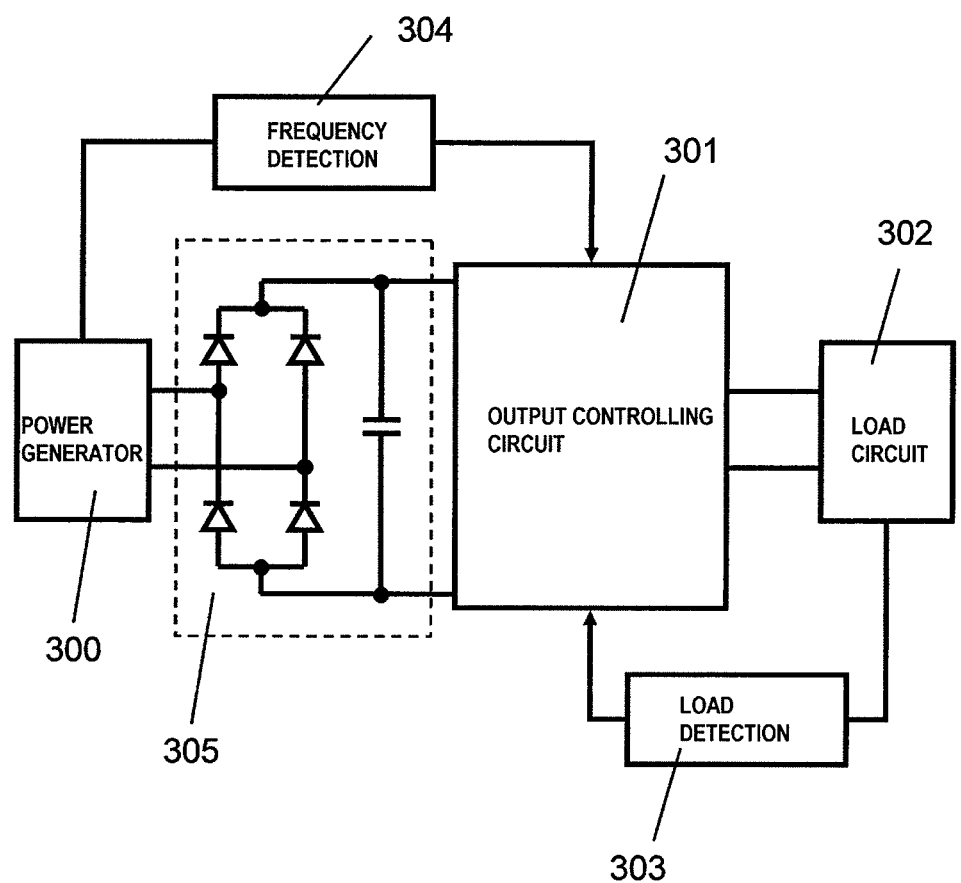
FIG. 5 is a block diagram showing a vibration power generating device according to a third embodiment of the present invention.

FIG. 5 is a block diagram of a vibration power generating device according to a third embodiment of the present invention. In this embodiment, both of the condition of the load circuit and the vibration frequency of the vibration power generator (the frequency of the output voltage) are detected, and the detected results are fed back to control the output controlling circuit.

As shown in FIG. 5, an output terminal of a vibration power generator 300 is connected to a rectifier circuit block 305 in the power generating device of this embodiment. The rectifier circuit block 305 is a full-wave rectifier circuit consisting of four diodes and a capacitor. The rectifier circuit block 305 is connected to an output controlling circuit and the output from the vibration power generator 300 is conveyed to this circuit block 305. The output controlling circuit 301 is connected to a load circuit 302.

A load detecting circuit 303 detects the operation condition of the load circuit 302 (the load condition) and feeds back the load condition to the output controlling circuit 301. The output controlling circuit 301 performs the control based on this feedback such that the power output from the vibration power generator 300 is maximal.

A frequency detecting circuit 304 detects the frequency of the power output from the vibration power generator 300 and feeds back the output condition to the output controlling circuit 301. The output controlling circuit 301 performs the control based on this feedback such that the maximal output power is obtained depending on the frequency.

The load circuit 302 and the vibration power generator 300 used in this embodiment are the same as the load circuit 102 and the vibration power generator 200 respectively, which are described respectively in the first embodiment and the second embodiment. The load detecting circuit 303 is the same as the load detecting circuit 103 described in the first embodiment. The frequency detecting circuit 304 is the same as the frequency detecting circuit 204 described in the second embodiment.

The vibration power generating device according to this embodiment gives the following effects:

1) The electricity generated by the vibration power generator can be extracted efficiently even if the vibration frequency is changed;

2) The electricity generated by the vibration power generator can be extracted efficiently even if the condition of the load is changed;

3) Controlling the impedance of the output controlling circuit to be constant makes it easy to design the voltage conversion circuit which converts the output voltage to a voltage level suited to the load.

The above effects are as described in the first embodiment and the second embodiment. In other words, the vibration power generating device of this embodiment gives useful effects, such as an effect of enabling the impedance to be varied in response to the change of the operation mode of the load circuit, and an effect of enabling the induced charges to be extracted effectively even in the operation in an environment where the external vibration changes.

Fourth Embodiment

Figure 6:
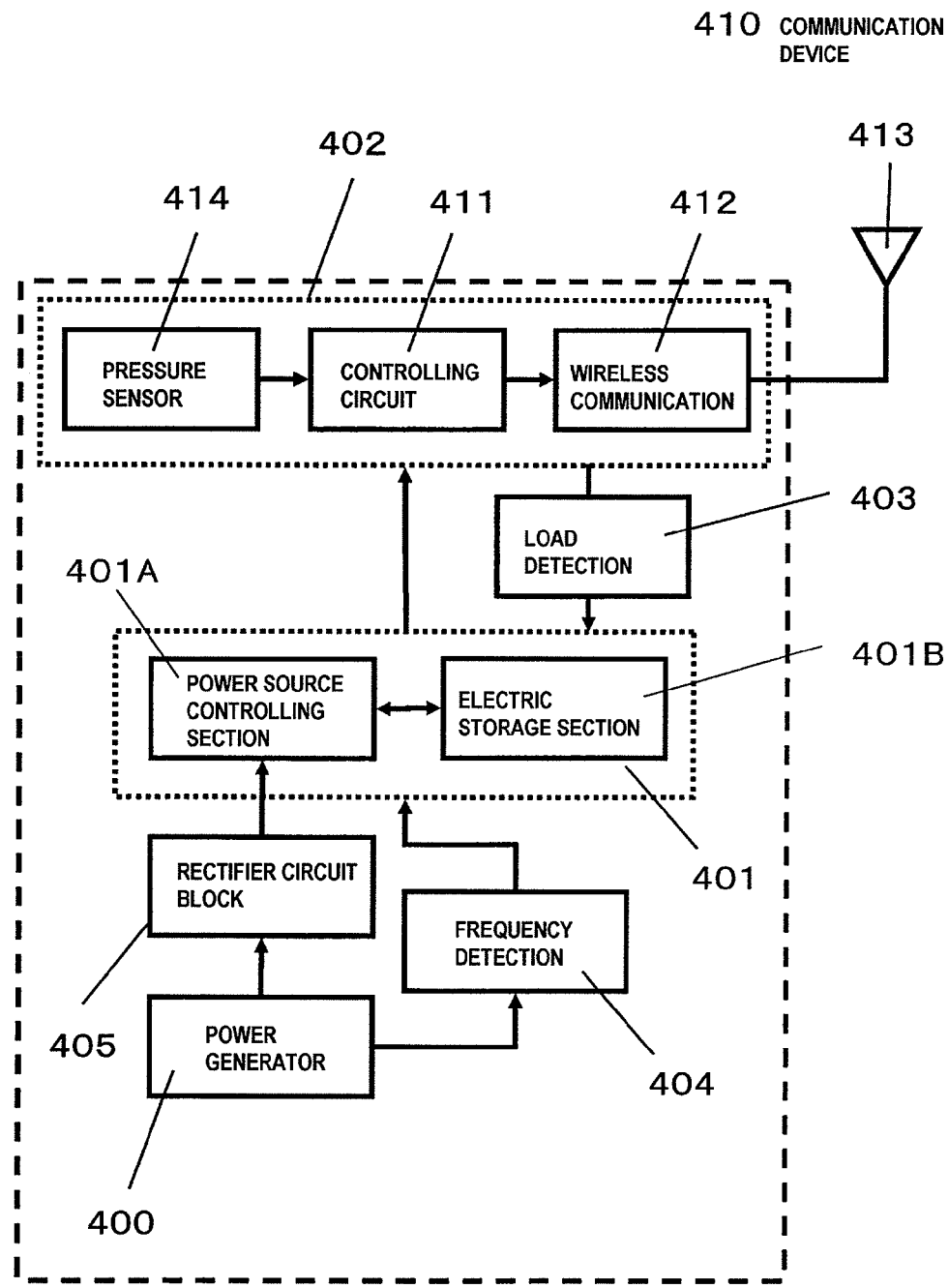
FIG. 6 is a block diagram showing a communication device according to a fourth embodiment of the present invention.
Figure 7:
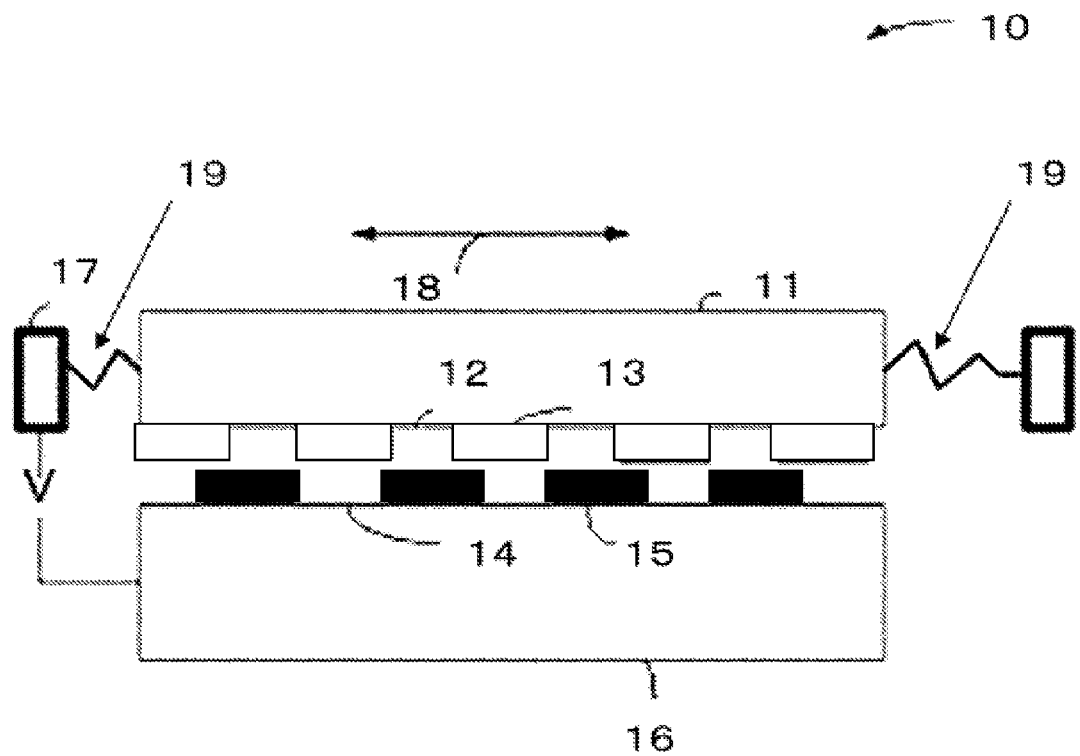
FIG. 7 is a cross-sectional view showing a structure of a prior static induction vibration power generator.
Figure 8:
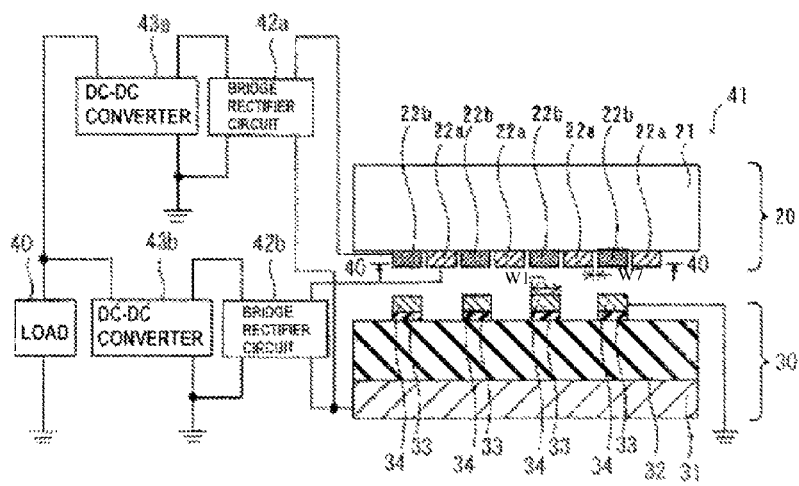
FIG. 8 is a block diagram showing a prior static induction vibration power generator.

FIG. 6 is a block diagram of a communication device which is used for a tire-pressure monitoring system mounted in an automobile. In FIG. 6, the vibration power generating device illustrated in the third embodiment is used as a power generating device, and an output controlling circuit 401 is constructed such that it includes a power source controlling section 401A and an electric storage section 401B.

In FIG. 6, a communication device 401 consists of a vibration power generator 400 which generates electricity by vibration, a rectifier circuit block 405, and a frequency detecting circuit 404 which detects the vibration frequency of the vibration power generator, an output controlling circuit 401, a load circuit 402, and a load detecting circuit 403 which detects the condition of the load.

The output controlling circuit 401 includes the power source controlling section 401A and the electric storage section 401B, as described above. Further, the load circuit 402 consists of a controlling circuit 411, a wireless communication circuit 412, an antenna 413 and a pressure sensor 414.

The operation of the communication device 410 of this construction is described. The power required for operating the pressure sensor 414, the controlling circuit 411, and the wireless communication circuit 412 is supplied by the vibration power generating device. The vibration power generating device supplies, to the load 402, an AC power extracted from the vibration power generator 400 which is vibrated by the vibration of tires. The AC power extracted is converted into a DC by the rectifier circuit block 405 and then output to the power source controlling section. The power source controlling section supplies, to the load circuit 402, only the power from the vibration power generator, the power from the vibration power generator and the electric storage section, or only the power from the electric storage section in response to the condition of the load circuit 402 which is detected by the load detecting circuit 403. The pressure sensor 414 determines the pressure of the tire and converts the determined results into electric signal that is input to the controlling circuit 411. The signal processed by the controlling circuit 411 is input to the wireless communication circuit 412 and then propagated as a high-frequency signal from the antenna 413.

The main operations of the load circuit 402 are the operation of storing the data from the sensor 414 in a memory (Operation 1), the operation of transmitting the data stored in the memory by wireless communication (Operation 2), and the operation of rendering the load circuit 402 on standby (Operation 3). The load (power consumption) applied during the operation decreases in the following order, Operation 2>Operation 1>Operation 3, and the load impedance is changed depending on the change of operation. The condition of Operation 1, Operation 2, or Operation 3 is detected by the load detection 403 and the detected results are fed back to the output controlling circuit 401, whereby the control is made such that the power output from the vibration power generator 400 is maximal.

Figure 9:
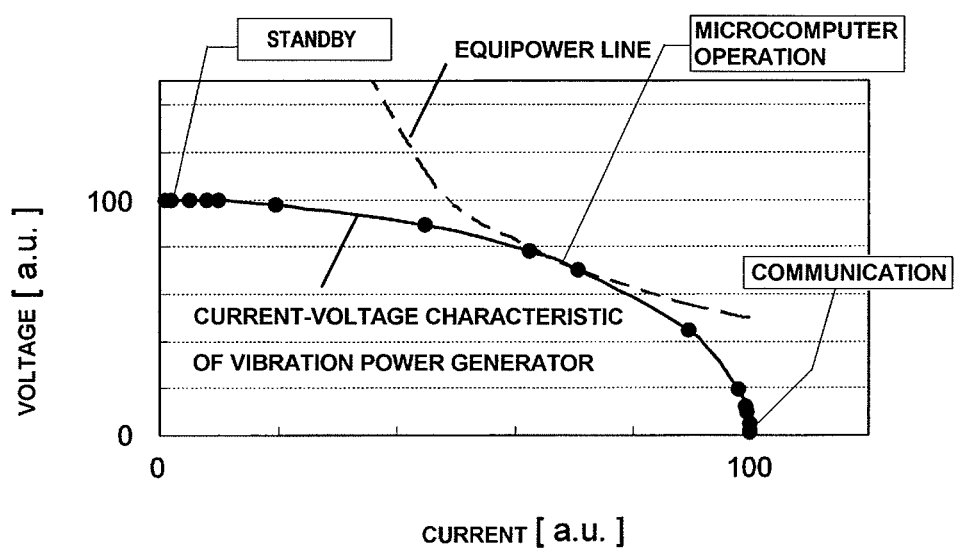
FIG. 9 is a graph showing a relationship between an output power and condition of a load circuit driven by the vibration power generating device according to the fourth embodiment of the present invention.

The control is specifically made such that the impedance of the output controlling circuit 401 is controlled to render the impedance viewed from the rectifier circuit block 405 to be constant. For example, when the operation mode of the load circuit 402 is changed into Operation 1 in the circuit wherein the amount of power generated by the vibration power generator 400 is maximal at the impedance at which the condition of the load circuit 402 is in the condition of Operation 2 as shown in FIG. 9, the charges are supplied to the electric storage circuit so that the input impedance of the output controlling circuit is constant. Further, when the operation mode is changed into Operation 3, the impedance of the electric storage circuit is controlled such that the input impedance is constant. The control is easily made by conducting switchover depending on the operation, using a switching device or the like.

Further, in this communication device, the frequency detecting circuit 404 detects the frequency of the power output from the vibration power generator 400 and feeds back it to the output controlling circuit 401. The output controlling circuit 401 performs control based on this feedback such that the maximal output power is obtained depending on the frequency.

The vibration power generating device of the present invention is used as the power source for the communication device in this manner, the number of maintenance operations, such as battery exchanges can be reduced, or the battery exchange can be eliminated. These are useful effects of the vibration power generating device of the present invention.

In this embodiment, an example is shown wherein the output controlling circuit includes an electric storage section, and a portion of the electricity from the vibration power generator is supplied to the electric storage section, and the stored electricity is optionally supplied to the load. In another embodiment, a battery may be used instead of, or together with the electric storage section. Alternatively, only the vibration power generator may be the power source and the electric storage section and/or the battery may be eliminated, if the power output by the vibration power generator sufficiently covers the power consumed by the pressure sensor, the controlling circuit, and the communication section and the power necessary for communication. In that case, the electric storage section and/or the battery and the power source controlling section are not necessary. This is advantageous in downscaling of the device.

Fifth Embodiment

Figure 11:
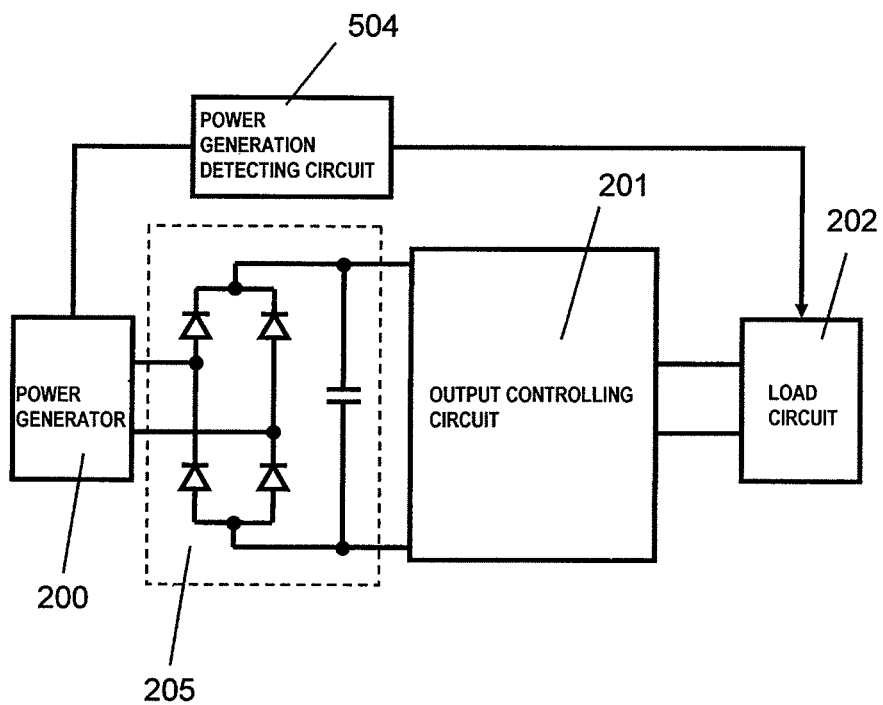
FIG. 11 is a block diagram showing a vibration power generating device according to a fifth embodiment of the present invention.

FIG. 11 is a block diagram of a vibration power generating device which is provided with a vibration power generator according to the third aspect of the present invention. In the power generating device of the second embodiment, the output frequency from the power generator is detected and the detected results are input to the output controlling circuit to control the output. In contrast, in this embodiment, the vibration power generator which is the same as that used in the second embodiment is used and the load circuit is controlled by detecting whether or not the vibration power generation by the power generator is made. In that point, the power generating device of the fifth embodiment is different from the power generating device of the second embodiment.

As shown in FIG. 11, the output terminal of the vibration power generator 200 is connected to the rectifier circuit block 205 in the power generating device of this embodiment. The rectifier circuit block 205 is a full-wave rectifier circuit consisting of four diodes and a capacitor. The rectifier circuit block 205 is connected to the output controlling circuit and the output of the vibration power generator 200 is conveyed to this circuit block 205. The output controlling circuit 201 is connected to the load circuit 202. A circuit denoted by 504 detects the output condition of the vibration power generator 200 and feeds back the output condition to the load circuit 202. Here, the circuit denoted by 504 is referred to as a "power generation detecting circuit" for convenience.

The construction of the vibration power generator preferably used in this embodiment is the same as that shown in FIG. 3(b) which is described in the second embodiment. Also in this embodiment, the increase and decrease in the overlapping area between the first electrodes 213 and the third electrodes 216 arises to induce the charges in the third electrode 216, whereby the third electrodes 216 output the AC voltage having the same frequency as that of the AC voltage from the second electrodes 215. In this embodiment, the power generation detecting circuit 504 may receive the frequency signal output from the third electrodes 216 only for detecting whether or not the vibration power generator is on power generation, or may detect the value of the power output from the vibration power generator 200 based on the frequency signal. In other words, the power generation detecting circuit is used for detecting one or more of whether or not the power is generated, the value of the output power, and the value of the output voltage.

Next, the operation of the vibration power generating device is described.

The electricity generated by the vibration power generator 200 is supplied to and consumed by the load circuit 202, similarly to the second embodiment. The point in which the power generating device of the present embodiment is different from that of the second embodiment is that the power generation detecting circuit 504 is provided instead of the frequency detecting circuit and the output of the power generation detecting circuit 504 is input to the load circuit 202.

Here, the power generation detecting circuit 504 is described in more detail. The power generation detection 504 detects the charges induced in the third electrodes 216 of the vibration power generator 200 (whether or not the power is generated) based on the signal output in response to the frequency of the power generation, using the change in overlapping area between the first electrodes 213 and the third electrodes 216 of the vibration power generator 200. In other words, when the vibration does not arise or the vibration frequency is equal to or below a certain value in the vibration power generator 200, the power generation detecting circuit 504 judges that the charges are not induced in the third electrodes 216 of the vibration power generator 200 and therefore the power generation is not made. The power generation detecting circuit 504 conducts an on/off control for the operation of the load circuit 202 depending on the power generation state (i.e. whether or not the power is generated) in the vibration power generator 200.

The vibration power generating device according to this embodiment can suppress the unnecessary power consumption in the load circuit by making the load circuit off when the power generator does not generate the power. Specifically, when the automobile does not run and the pressure of the tire is not required to be monitored as in the below-described tire-pressure monitoring system, that is, in the case where the load is not required to be operated when the vibration power generator does not vibrate, the operation of the load is stopped to suppress the unnecessary consumption of the power from a dry battery or a storage battery.

In this embodiment, the power generation detecting circuit 504 is connected to the load circuit 202 to control the load circuit 202 directly. In a variant of this embodiment, the power generation detecting circuit 504 is connected to the output controlling circuit 201 to make control such that the output from the output controlling circuit 201 to the load circuit 202 is stopped. In that case, the same effect as that given by the device shown in FIG. 11 is given.

Figure 12:
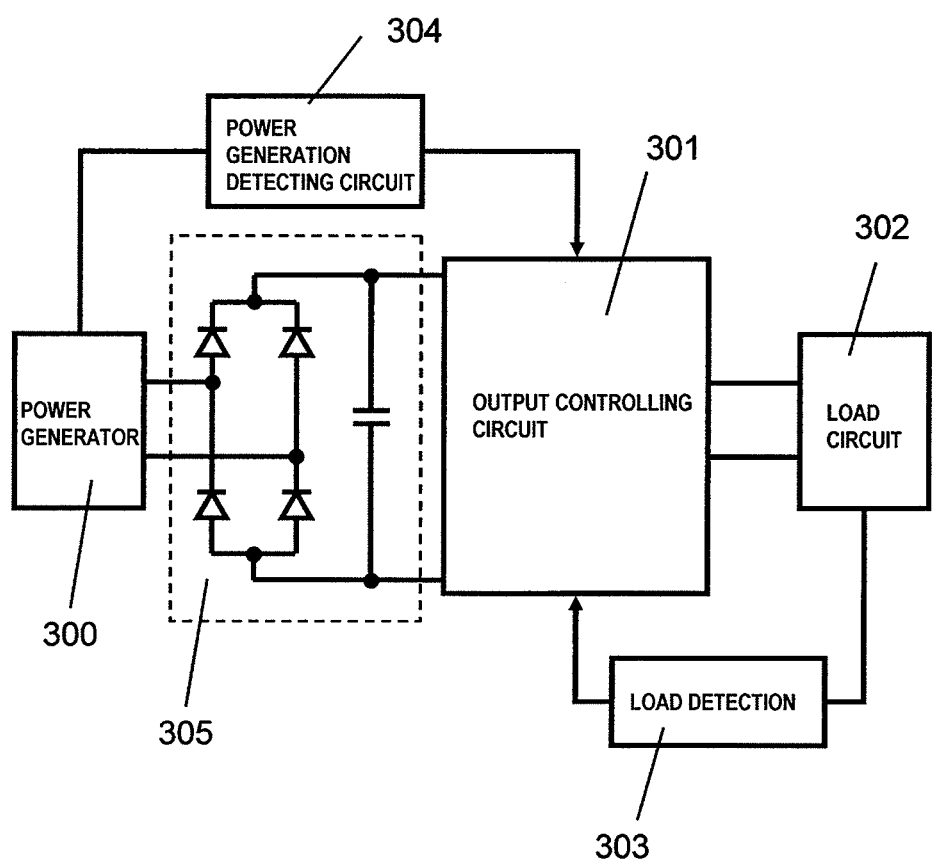
FIG. 12 is a block diagram showing a vibration power generating device according to a variant of the fifth embodiment of the present invention.

Further, in another variant of this embodiment (see FIG. 12), the load is detected by the load circuit 302 and the detected results are fed back to the output controlling circuit 301, while the power generation state of the power generator 300 is detected by the power generation detecting circuit 504 and then fed back to the output controlling circuit 301. Such control makes it possible to conduct the load control (specifically, the impedance control) in accordance with the load condition and to suppress unnecessary power consumption in the load circuit when the vibration power generator does not generate power.

Sixth Embodiment

Figure 13:
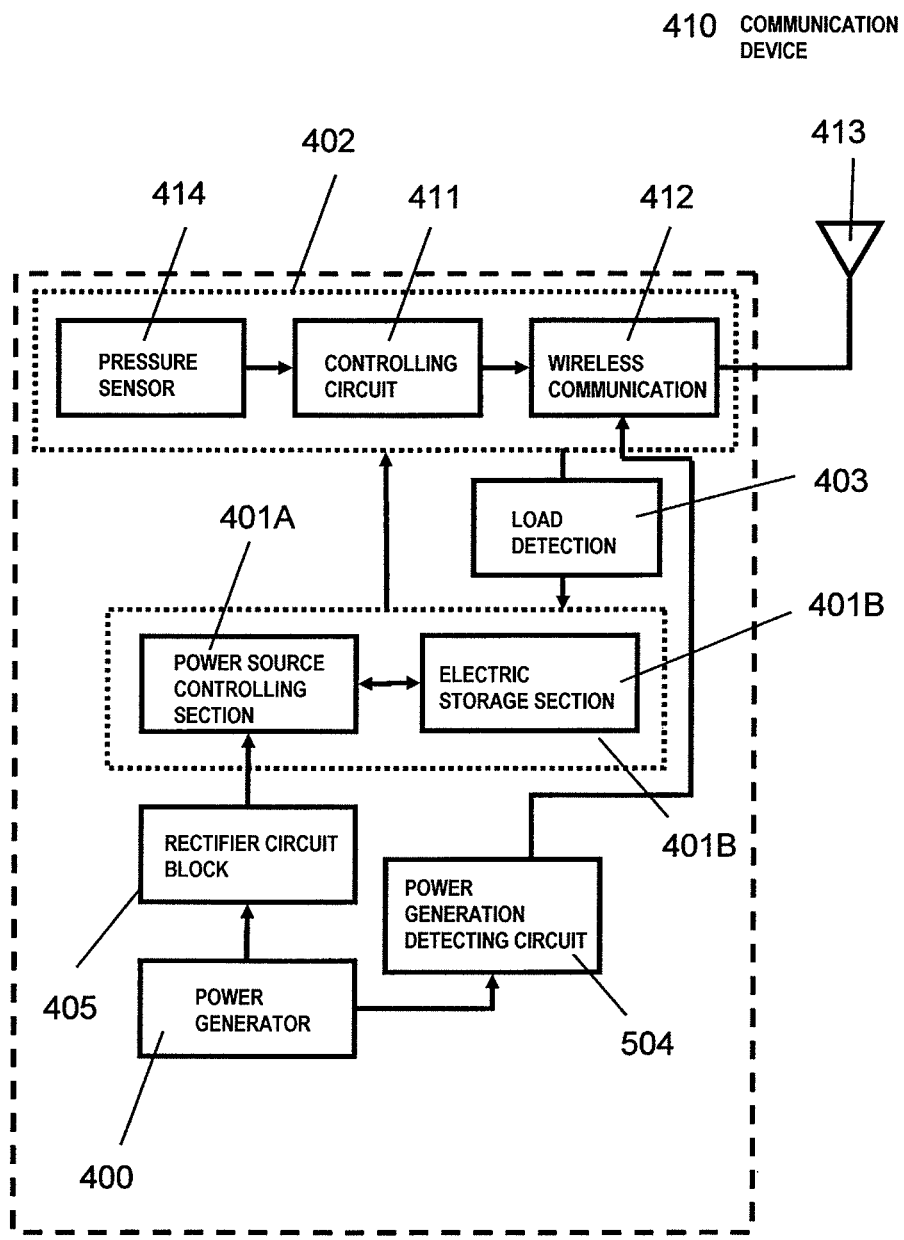
FIG. 13 is a block diagram showing a communication device according to a sixth embodiment of the present invention.

FIG. 13 is a block diagram of a communication device which is used in a tire-pressure monitoring system mounted in an automobile. In FIG. 13, the vibration power generating device illustrated in the fifth embodiment is used as a power generating device and a power generation detecting circuit 404 is connected to a wireless communication circuit 412 which constitutes a load circuit 402. The communication device 410 shown in FIG. 13 is different from the communication device shown in FIG. 6 only in that the power generation circuit 504 is provided instead of the frequency detection circuit 404 shown in FIG. 6.

In FIG. 13, the communication device 410 is composed of a vibration power generator 400 which generates electricity by vibration, a rectifier circuit block 405, a power generation detecting circuit 404 which detects whether or not the power is generated, an output controlling circuit 401, a load circuit 402, and a load detection circuit 403 which detects the condition of the load.

The output controlling circuit 401 includes a power source controlling section and an electric storage section. Further, the load circuit 402 consists of a controlling circuit 411, a wireless communication circuit 412, an antenna 413 and a pressure sensor 414.

The operation of the communication device 410 of this construction is described. The power required for operating the pressure sensor 414, the controlling circuit 411 and the wireless communication circuit 412 is supplied by the vibration power generating device. The vibration power generating device supplies, to the load 402, an AC power extracted from the vibration power generator 400 which is vibrated by the vibration of the tire. The AC power extracted is converted into a DC power by the rectifier circuit block 405 and then output to the power source controlling section 401A. The power source controlling section 401A supplies, to the load circuit 402, only the power from the vibration power generator, or the power from the vibration power generator and the electric storage section 401B, or only the power from the electric storage section 401B in response to the condition of the load circuit 402 which is detected by the load detecting circuit 403. The main operations of the load circuit 402 are as described in connection with the fourth embodiment. Specifically, the pressure sensor 414 determines the pressure of the tire and converts the determined results into a voltage signal. This voltage signal is input to the controlling circuit 411. The signal processed by the controlling circuit 411 is input to the wireless communication circuit 412 and propagated as a high-frequency signal from the antenna 413.

The operation of the power generation detection circuit 504 is described. The tire-pressure monitoring system generally determines the pressure of the tire and informs a driver of the abnormality of the pressure if any so as to assist stable running of the automobile. In other words, when the automobile stops, it is not necessary to transmit the information of the tire pressure from the wireless communication circuit 412 and to determine the pressure of the tire by the pressure sensor.

Thus, the power generation detecting circuit 504 detects whether or not the power generator 400 generates the power, that is, whether or not the automobile runs, and transmits, to the wireless communication circuit 412, a signal indicating that the power generator is on power generation when the power generator generates the electricity. When the wireless communication circuit 412 receives the signal, it operates such that the pressure information is transmitted to a receiving section (not shown). On the other hand, when the vibration power generator does not generate the power (that is, when the automobile stops, or in the case where the automobile is regarded as being in a stopped state), the power generation detecting circuit 504 transmits the signal indicating that to the wireless communication circuit 412, and the wireless communication circuit 412 stops its operation when receiving the signal. The load circuit 402 is turned on and off in this manner based on the detection signal from the power generation detecting circuit 504, which leads to useful effects such that the unnecessary power loss can be eliminated.

Alternatively, in a variant of the present embodiment, when the power generator is not on power generation, the operation of the pressure sensor 414 may be stopped. In that case, the effect as described above can be obtained. Alternatively, in another variant, the power generation detecting circuit 504 may be connected to the controlling circuit 411. In that variant, when the signal indicating that the power generator is not on power generation is transmitted by the power generation detecting circuit 504, the controlling circuit 411 transmits the control signal which stops the operation of the wireless communication circuit 412 and/or the operation of the pressure sensor. Unnecessary power loss can be further eliminated in the communication device of that construction.

In this embodiment, an example is shown, wherein the operation of the load circuit is turned on and off by whether or not the power is generated. In another embodiment, the power generation detecting circuit 504 may, for example, detects the output power of the power generator based on the signal which is output depending on the power frequency, using the change in the overlapping area between the first electrodes and the third electrodes. In that case, the communication device 410 may be constructed so that, when the output power equal to or below a desired value is detected by the power generation detecting system 504, the load circuit 402 operates such that, for example, only the pressure sensor 414 is operated and the frequency of the wireless communications is decreased. Unnecessary power loss can be eliminated also in such a communication device 410.

The description related to the vibration power generator in the second embodiment is applicable to all the vibration power generators which are used in vibration power generating device wherein the frequency signal output from the third electrodes is used by the power generation detecting circuit for detecting the power generation state of the vibration power generator. In other words, in the vibration power generating device represented by the fifth embodiment and the sixth embodiment, wherein the power generation state is detected, the vibration power generator includes:

an electrode group A consisting of a plurality of first electrodes, which group is formed on a first substrate, an electrode group B consisting of a second electrode and a third electrode, which group is formed on a second substrate, wherein any one of the electrode group A and the electrode group B is capable of vibrating in at least one direction which is within a plane parallel to the first substrate and the second substrate, each electrode in any one of the electrode group A and the electrode group B contains a film retaining electric charges, the electrode group A and the electrode group B are opposed to each other with a gap therebetween, and which generator generates power using change in overlapping area between the first electrode and the second electrode, and outputs a signal depending on a frequency of the power generation using change in overlapping area between the first electrode and the third electrode.

In this vibration power generator, it is preferable that the third electrode are formed such that the capacitance formed by the third electrode and the first electrode is smaller than the capacitance formed by the second electrode and the first electrode. The signal generated by the change in overlapping area between the third electrode and the first electrode is used for detecting the power generation state, and not for the power generation. Therefore, the capacitance formed between the third electrode and the first electrode is preferably small to increase the capacitance formed between the second electrode and the first electrode in order that the generated power is increased. However, it is not precluded that the capacitance formed between the third electrode and the first electrode is equal to or larger than the capacitance formed between the second electrode and the first electrode as long as the signal generated by the change in overlapping area between the third electrode and the first electrode is used as the signal for detecting the power generation state.

In this vibration power generator, it is preferable that the third electrode is formed such that the impedance formed by the third electrode and the first electrode is higher than the impedance formed by the second electrode and the first electrode. The reason therefor is as described in the second embodiment.

In this vibration power generator, the third electrode is preferably formed at around the center of the second substrate. The reason therefor is as described in the second embodiment.

In this vibration power generator, the third electrode is formed at around the center of the second substrate. The reason therefor is as described in the second embodiment. Further, in this vibration power generator, the third electrode is preferably one of which output terminals are to be connected to the power generation detecting circuit.

It should be noted that the embodiments described above are exemplary in every respect, and are not intended to be limiting. The scope of the present invention is shown by, not the above-described explanation, but the scope of claims, and is intended to encompass all modifications within the spirit and scope equal to the scope of claims.

INDUSTRIAL APPLICABILITY

The vibration power generating device according to the present invention can efficiently extract the induced charges from the vibration power generator when the impedance of the load circuit and the vibration frequency of the vibration power generator are changed, and is useful as the static induced vibration power generating device. Further, the vibration power generating device according to the present invention is very useful since it enables the lifetime of a battery to be lengthen or the battery-less operation to be realized in applications such as a low electric power wireless communication modules or the like.

REFERENCE SIGNS LIST

100 Vibration power generator
101 Output controlling circuit
102 Load circuit
103 Load detecting circuit
111 Controlling circuit
12 Wireless communication circuit
113 Antenna
114 Sensor
204 Frequency detection
211 First structure
212 Second structure
213 First electrode
214 Elastic structure
215 Second electrode
216 Third electrode
400 Communication device
504 Power generation detecting circuit

What is claimed is:

1. A vibration power generating device comprising:
a vibration power generator,
a rectifier circuit which rectifies an AC output voltage from the vibration power generator and converts the AC output voltage into a DC voltage,
an output controlling circuit which controls an output from the rectifier circuit and inputs the output to a load circuit,
a frequency detecting circuit which detects a vibration frequency of the vibration power generator,
wherein the vibration power generator comprises:
    an electrode group A consisting of a plurality of first electrodes, which group is formed on a first substrate,
    an electrode group B consisting of a second electrode and a third electrode, which group is formed on a second substrate,
    wherein any one of the electrode group A and the electrode group B is capable of vibrating in at least one direction which is within a plane parallel to the first substrate and the second substrate,
    each electrode in any one of the electrode group A and the electrode group B contains a film retaining electric charges,
    the electrode group A and the electrode group B are opposed to each other with a gap therebetween, and
    which generator generates power using change in overlapping area between the first electrode and the second electrode, and
    outputs a signal depending on a frequency of the power generation using change in overlapping area between the first electrode and the third electrode,
the signal which is output depending on the frequency of the power generation using change in overlapping area between the first electrode and the third electrode is transmitted to the frequency detecting circuit and, based on the signal, the frequency detecting circuit transmits a feedback signal to the output controlling circuit, and
an impedance of the output controlling circuit is controlled based on the feedback signal from the frequency detecting circuit.

2. The vibration power generating device according to claim 1, wherein the third electrode is formed such that a capacitance formed by the third electrode and the first electrode is smaller than the capacitance formed by the second electrode and the first electrode in the vibration power generator.

3. The vibration power generating device according to claim 1, wherein the third electrode is formed such that an impedance formed by the third electrode and the first electrode is higher than the impedance formed by the second electrode and the first electrode in the vibration power generator.

4. The vibration power generating device according to claim 1, wherein the third electrode is formed at around a center of the second substrate.

5. The vibration power generating device according to claim 1, wherein the output controlling circuit controls the impedance such that an output voltage of the vibration power generator is 75% to 85% of an open-circuit voltage.

6. A communication device comprising the vibration power generating device according to claim 1.

7. The communication device according to claim 6, which further comprises a battery.

8. A vibration power generator comprising:
an electrode group A consisting of a plurality of first electrodes, which group is formed on a first substrate,
an electrode group B consisting of a second electrode and a third electrode, which group is formed on a second substrate,
wherein any one of the electrode group A and the electrode group B is capable of vibrating in at least one direction which is within a plane parallel to the first substrate and the second substrate,
each electrode in any one of the electrode group A and the electrode group B contains a film retaining electric charges,
the electrode group A and the electrode group B are opposed to each other with a gap therebetween, and
the third electrode is formed such that a capacitance formed by the third electrode and the first electrode is smaller than the capacitance formed by the second electrode and the first electrode,
which generator generates power using change in overlapping area between the first electrode and the second electrode, and
outputs a signal depending on a frequency of the power generation using change in overlapping area between the first electrode and the third electrode.

9. The vibration power generator according to claim 8, wherein the third electrode is formed such that an impedance formed by the third electrode and the first electrode is higher than the impedance formed by the second electrode and the first electrode.

10. The vibration power generator according to claim 8, wherein the third electrode is formed at around a center of the second substrate.

11. A communication device comprising the vibration power generator according to claim 8.

12. The communication device according to claim 11, which further comprises a battery.

13. A vibration power generating device which comprises:
a vibration power generator comprising:
an electrode group A consisting of a plurality of first electrodes, which group is formed on a first substrate,
an electrode group B consisting of a second electrode and a third electrode, which group is formed on a second substrate,
wherein any one of the electrode group A and the electrode group B is capable of vibrating in at least one direction which is within a plane parallel to the first substrate and the second substrate,
each electrode in any one of the electrode group A and the electrode group B contains a film retaining electric charges,
the electrode group A and the electrode group B are opposed to each other with a gap therebetween, and
which generator generates power using change in overlapping area between the first electrode and the second electrode, and
outputs a signal depending on a frequency of the power generation using change in overlapping area between the first electrode and the third electrode, and
wherein the signal which is output depending on the frequency of the power generation using change in overlapping area between the first electrode and the third electrode is used as a signal indicating a power generation state of the vibration power generator.

14. The vibration power generating device according to claim 13, which further comprises an output controlling circuit,
wherein the signal which is output depending on the frequency of the power generation using change in overlapping area between the first electrode and the third electrode is transmitted as the signal indicating the power generation state of the vibration power generator, to the output controlling circuit.

15. The vibration power generating device according to claim 13, which further comprises an output controlling circuit, and
is adapted to transmit, as the signal indicating the power generation state of the vibration power generator, the signal which is output depending on the frequency of the power generation using change in overlapping area between the first electrode and the third electrode, to a load circuit which is to be connected to the vibration power.

16. The vibration power generating device according to claim 13, wherein the signal indicating the power generation state of the vibration power generator is one or more signals selected from a signal indicating whether or not the vibration power generator is on power generation, a signal of an output power of the vibration power generator, and a signal of an output voltage of the vibration power generator.

17. The vibration power generating device according to claim 13, wherein the third electrode is formed such that a capacitance formed by the third electrode and the first electrode is smaller than the capacitance formed by the second electrode and the first electrode.

18. A communication device comprising the power generating device according to claim 13.

19. The communication device according to claim 18, which further comprises a battery.

* * * * *